R. J. FOLSE AND F. L. HECKER.
TRACTOR.
APPLICATION FILED JULY 25, 1921.

1,428,584.

Patented Sept. 12, 1922.
11 SHEETS—SHEET 7.

INVENTORS:
Raphael J. Folse
and Frederick L. Hecker,
BY
ATTORNEYS.

R. J. FOLSE AND F. L. HECKER.
TRACTOR.
APPLICATION FILED JULY 25, 1921.
1,428,584.
Patented Sept. 12, 1922.
11 SHEETS—SHEET 8.
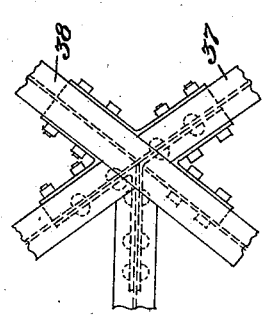
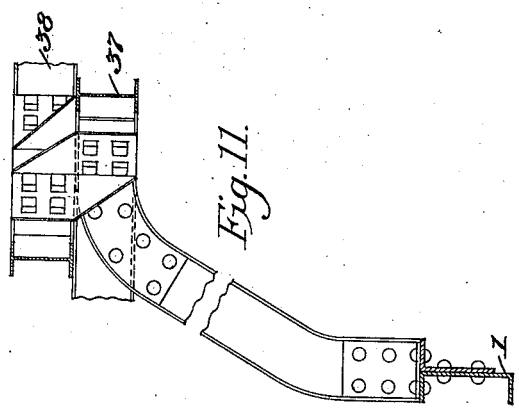
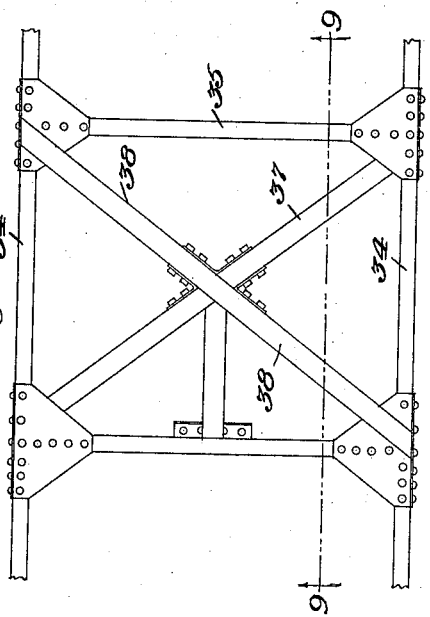
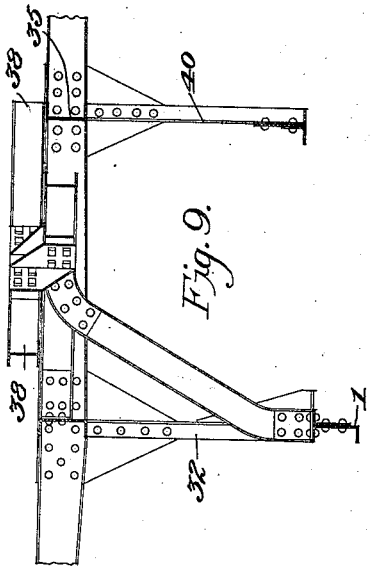
INVENTORS:
Raphael J. Folse
and Frederick L. Hecker,
BY
Cushman, Bryant & Darby
ATTORNEYS.

R. J. FOLSE AND F. L. HECKER.
TRACTOR.
APPLICATION FILED JULY 25, 1921.

1,428,584.

Patented Sept. 12, 1922.
11 SHEETS—SHEET 9.

Fig. 16.

INVENTORS.
Raphael J. Folse
Frederick L. Hecker
BY Cushman, Bryant & Darby
ATTORNEYS.

R. J. FOLSE AND F. L. HECKER.
TRACTOR.
APPLICATION FILED JULY 25, 1921.
1,428,584.
Patented Sept. 12, 1922.
11 SHEETS—SHEET 10.
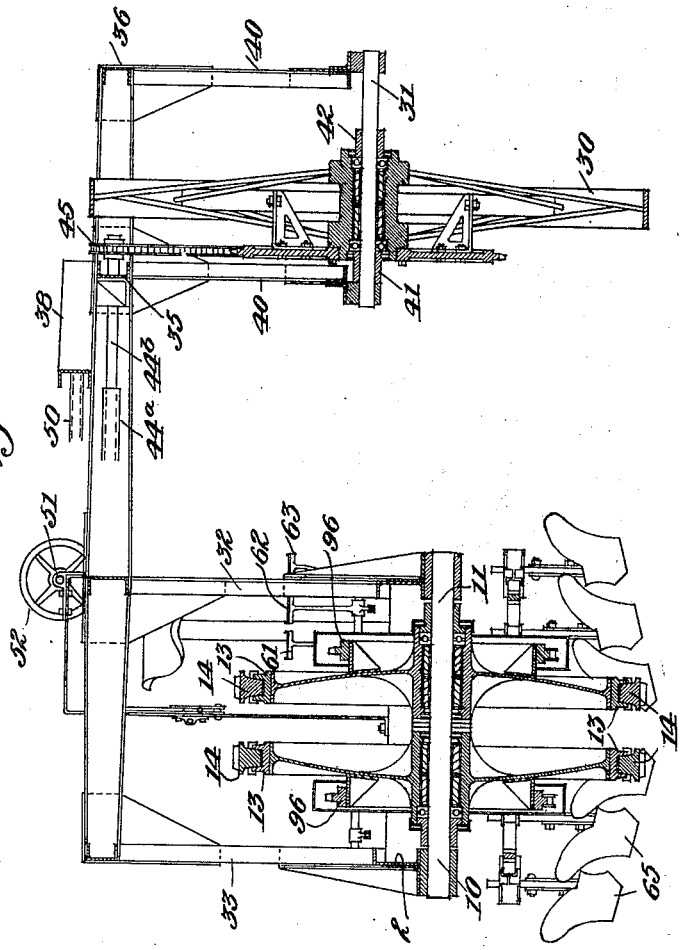

Patented Sept. 12, 1922.

1,428,584

UNITED STATES PATENT OFFICE.

RAPHAEL JOSEPH FOLSE AND FREDERICK LAWRENCE HECKER, OF NEW ORLEANS, LOUISIANA.

TRACTOR.

Application filed July 25, 1921. Serial No. 487,228.

*To all whom it may concern:*

Be it known that we, RAPHAEL JOSEPH FOLSE and FREDERICK LAWRENCE HECKER, citizens of the United States, residing at New Orleans, in the parish of Orleans and State of Louisiana, have invented new and useful Improvements in Tractors, of which the following is a specification.

The present invention relates to improvements in tractors of the class or type in which flexible endless traction members are employed.

One of the objects of the invention is to provide an apparatus of this type or character which will be particularly adapted for use with implements used in cultivating growing plants. According to the present invention the traction members are arranged relatively close together so that they are all adapted to travel in a single furrow between two rows of plants and the traction members are of such character as to assist in thoroughly breaking up or disintegrating soil between such rows.

A further feature of the present invention by which the above stated object is attained is the construction of the main frame of the apparatus, which enables it to be employed with cultivating implements in treating the soil about plants of considerable height as well as those which extend a short distance above the ground.

A further object of the invention is to provide a tractor in which the several parts will be compactly arranged so that the machine may be readily manipulated and in which a maximum amount of strength will be provided.

As above stated, the improved tractor is particularly adapted for use with plant cultivating implements, and such an embodiment thereof is illustrated in the accompanying drawings. Many of the features of the invention, however, are not limited to use with such special implements but are capable of use in tractors adapted for other purposes.

In the accompanying drawings—

Figure 1:
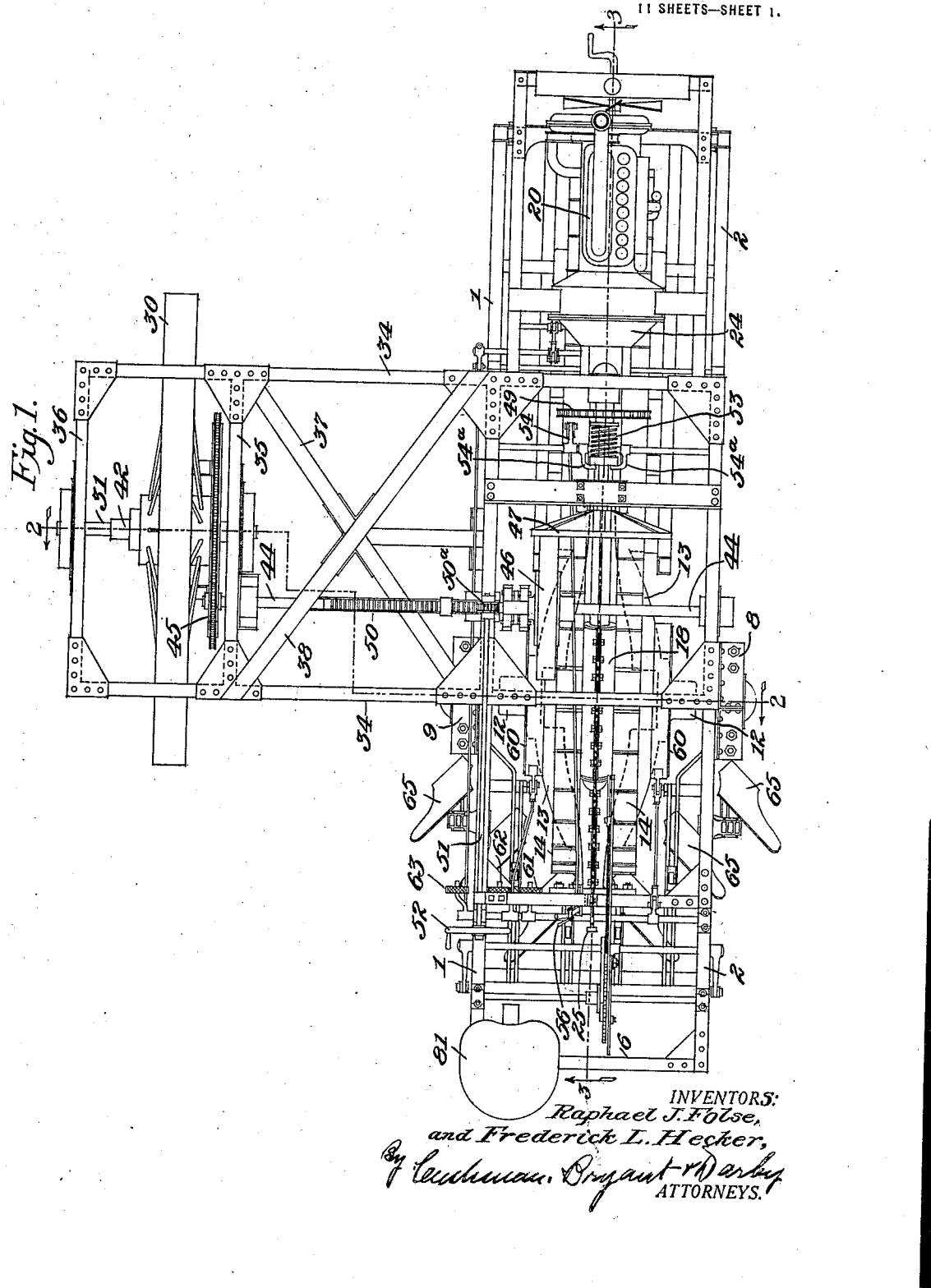
Fig. 1 is a plan view of a tractor constructed in accordance with the present invention.
Figure 2:
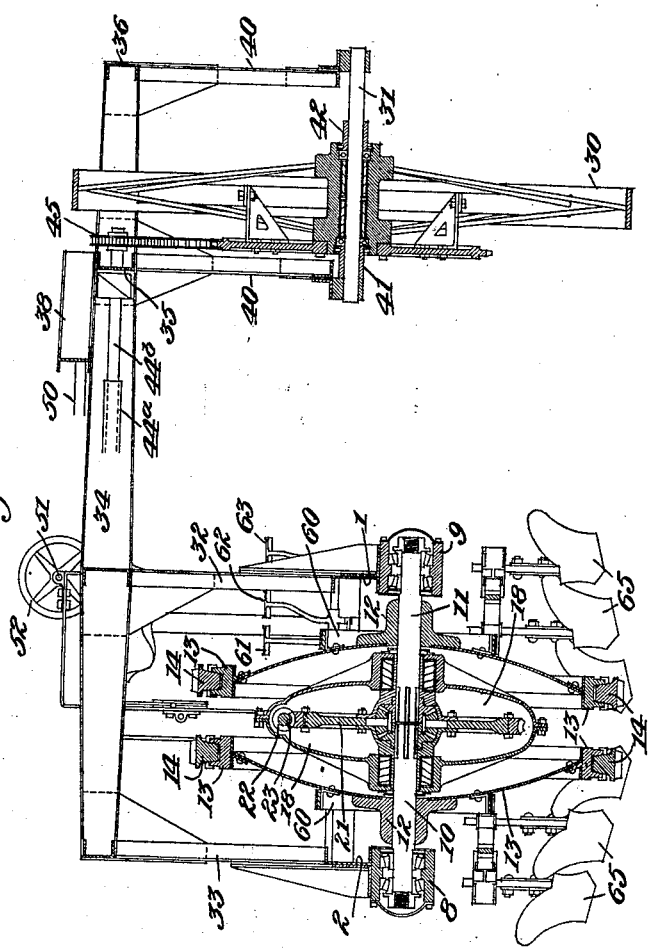
Fig. 2 is a transverse sectional view substantially on the line 2—2 of Fig. 1.
Figure 3:
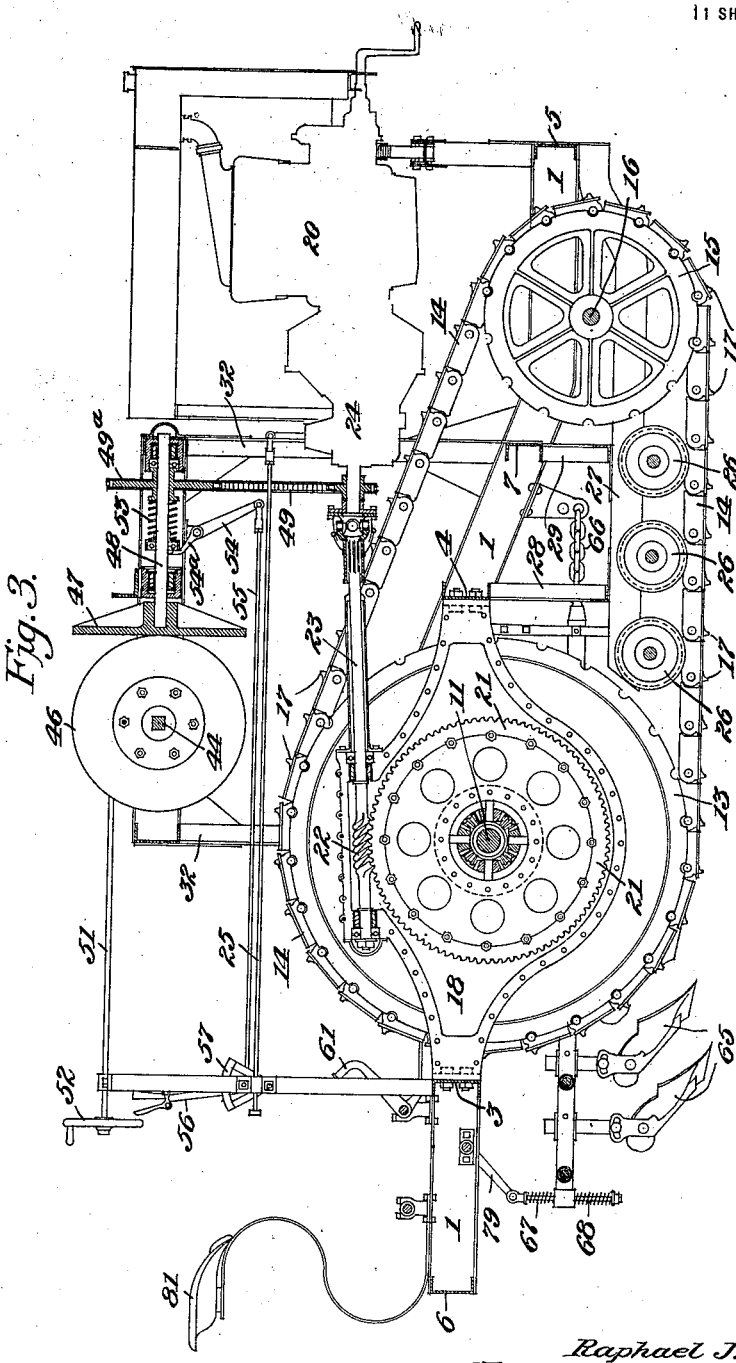
Fig. 3 is a longitudinal vertical section substantially on the line 3—3 of Fig. 1.
Figure 4:
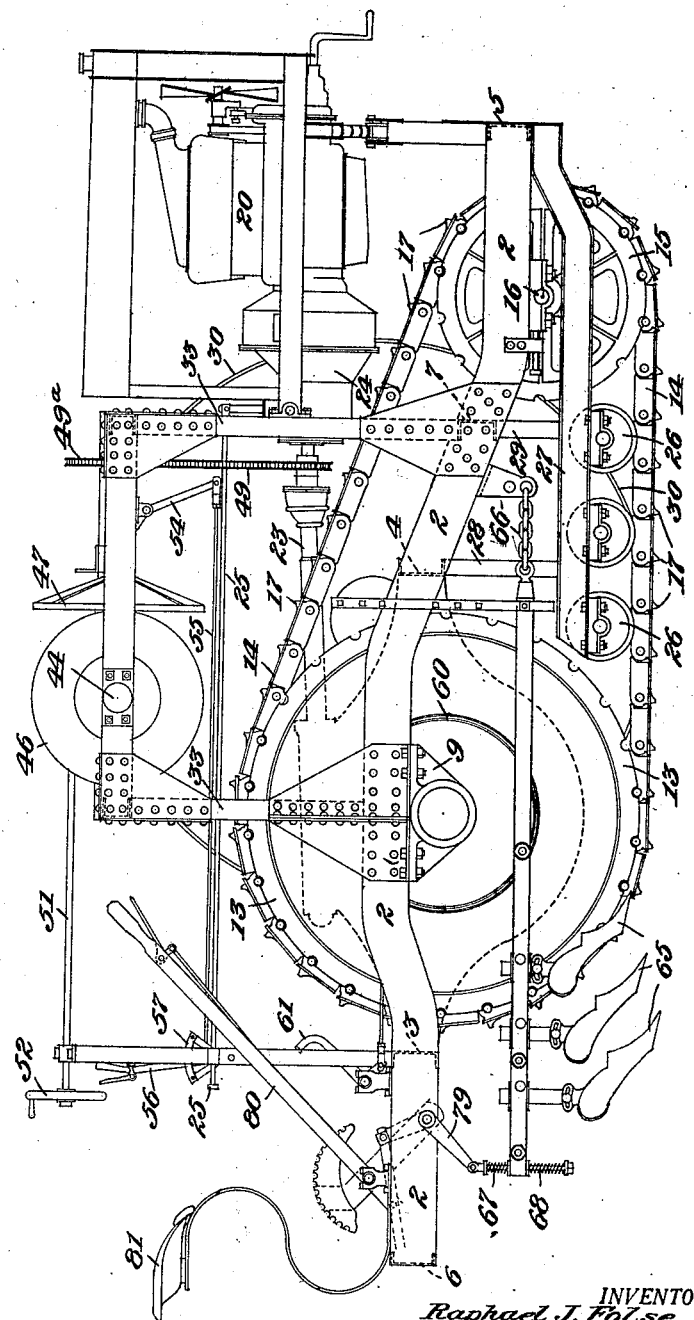
Fig. 4 is an elevation of one side of the machine.
Figure 5:
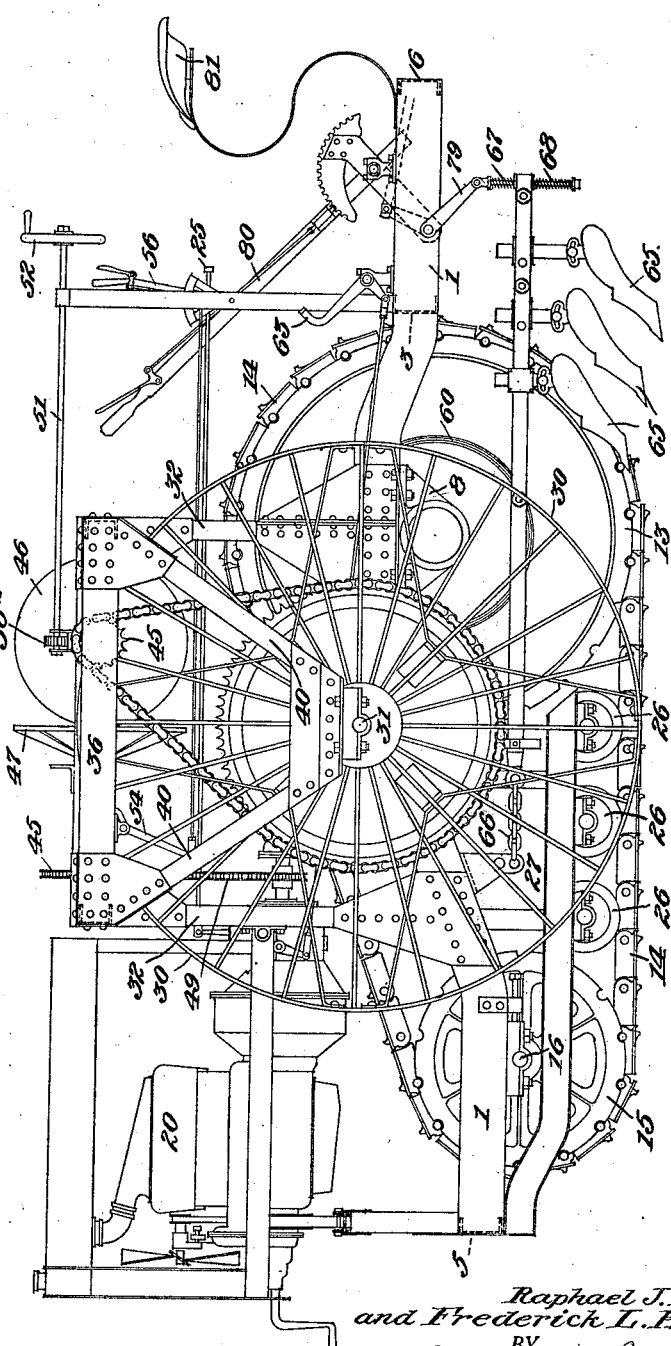
Fig. 5 is an elevation of the opposite side.
Figure 14:
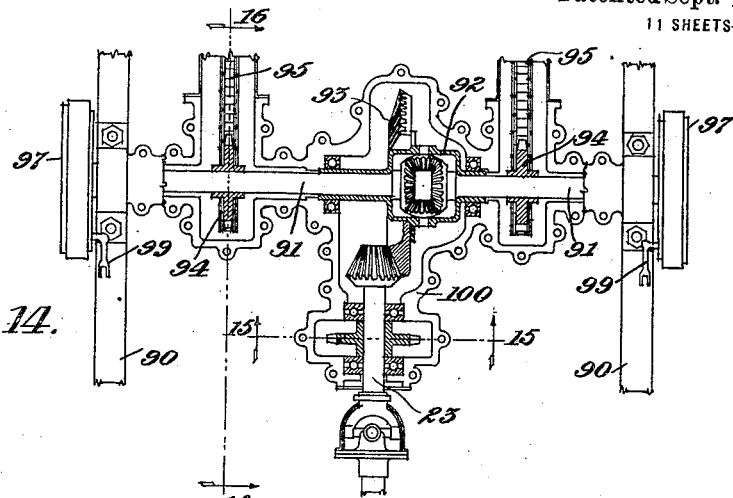
Figures 15, 16:
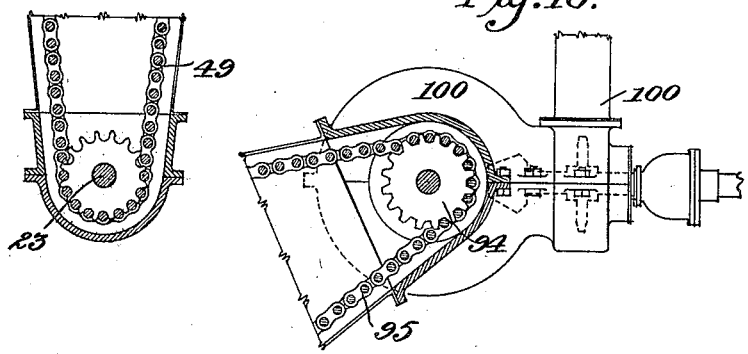

Figs. 8 to 11 inclusive, are detail views of portions of the framework of the machine;

Fig. 12 is a side elevation illustrating a slight modification;

Fig. 13 is a view similar to Fig. 2 of the construction shown in Fig. 12;

Fig. 14 is an enlarged horizontal section through the connection of the engine to the traction members in the form shown in Figs. 12 and 13;

Fig. 15 is a detail section on the line 15—15 of Fig. 14;

Fig. 16 is a detail section on the line 16—16 of Fig. 14.

Referring to the drawings, the main framework comprises longitudinally extending girders or frame bars 1, 2, that extend throughout the length of the machine and are suitably connected and braced, as required, by transversely extending bars, several of which are indicated at 3, 4, 5, 6 and 7. As shown, the several members of the frame are preferably formed from channeled bars or beams suitably bolted or riveted together so that the structure as a whole will be of minimum weight, while possessing a maximum amount of strength and rigidity.

On suitable bearings arranged in casings 8, 9, connected to and depending from the longitudinal frame members 1, 2, are mounted two aligned axles 10, 11, to which are rigidly secured the hubs 12 of a pair of traction member driving sprockets 13. The traction members include two endless belts, each comprising a series of pivotally connected links 14 and said traction members are supported by the sprockets 13 and by guide wheels 15 loosely mounted on an axle 16 carried by bearings attached to the frame members 1, 2. As shown, each link of the traction belts is provided with a spur or tooth 17 which is adapted to engage the ground as the belt travels longitudinally and which besides affording a firm grip to cause motion of the machine are also adapted to break up the soil with which the traction members engage so that the action of cultivator implements mounted on the frame in rear thereof will be facilitated.

Adjacent their inner ends, axles 10, 11, are supported by bearings provided in a housing or casing 18, which is supported by the transverse bars 3, 4, of the frame and within which is arranged a differential gearing that connects the inner ends of the axles 10, 11.

Figure 6:
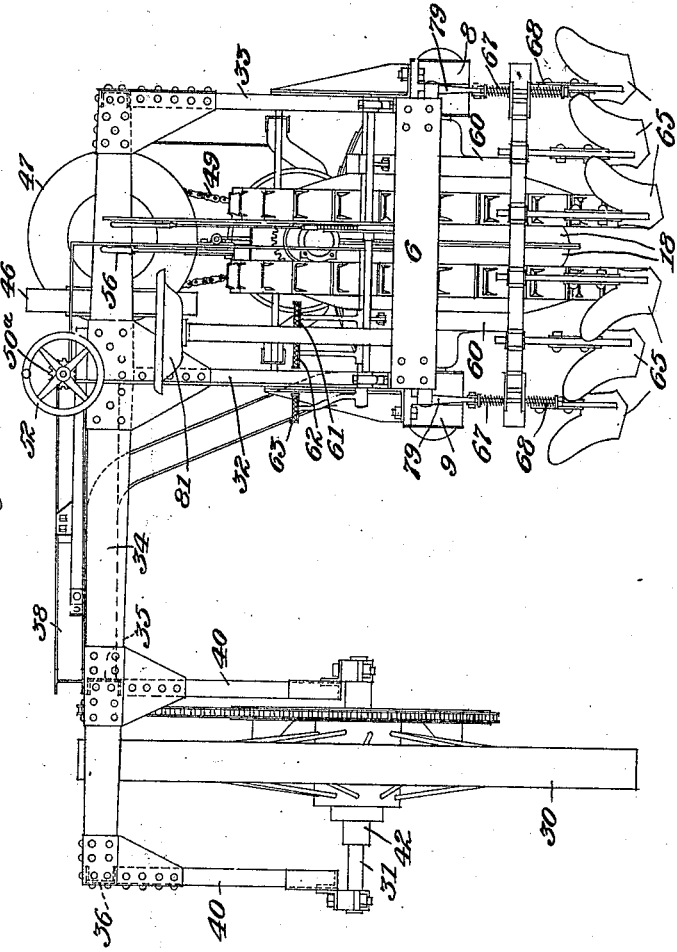
Fig. 6 is a rear elevation.
Figure 7:
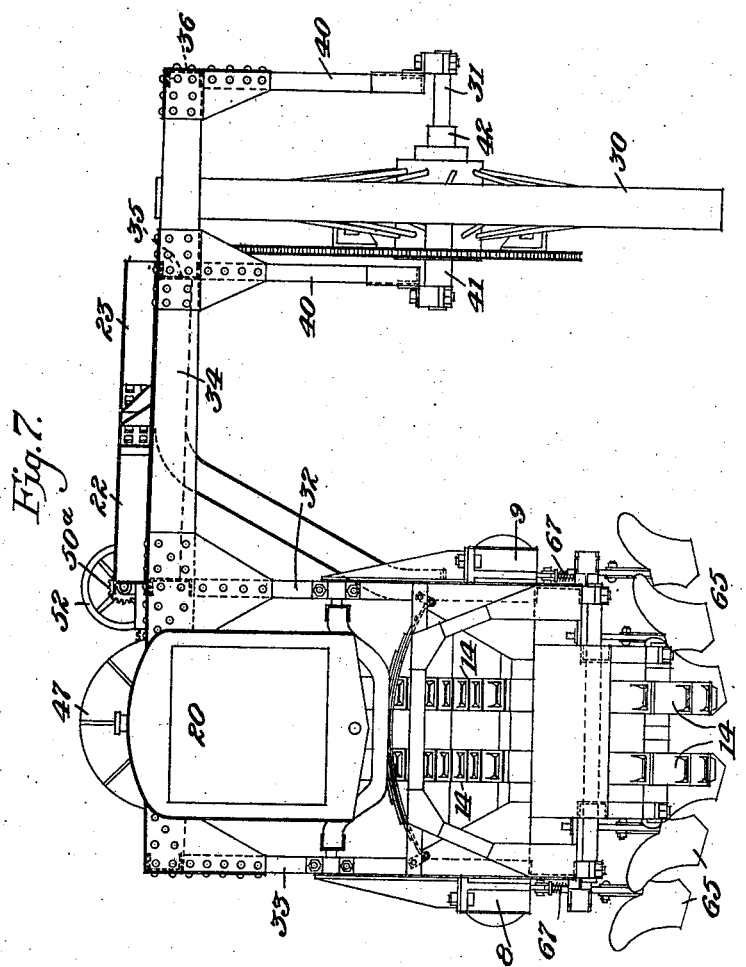
Fig. 7 is a front elevation.

As shown in the drawings, particularly in Figures 2 and 6, the differential casing or housing 18 is formed in two sections which are bolted together and the sprockets 13 are arranged very close to the sides of such casing, the bodies of said sprockets being oppositely curved, or dished, so as to closely surround such casing and bring the traction members relatively close together. By mounting the traction members in the particular manner shown and described, they are adapted to travel in a single furrow at one side of a row of growing plants and to engage the ground at practically the lowest points in said furrow. By this arrangement also the weight of the machine is applied at the lowest possible point and in such manner that it tends to travel at all times parallel with the row of plants and the latter are not likely to be injured by the traction members coming in contact therewith.

Mounted on uprights rising from the main frame, at the forward end thereof, is a motor 20 which may be of any suitable form or type, an explosive motor being conventionally illustrated, and power from such motor is transmitted to the main worm wheel 21 of the differential gearing through a worm 22 on a shaft 23. A suitable variable speed transmission gearing is arranged within the motor casing 24 and adapted to be controlled as desired through a control rod 25 so that the speed at which the main differential wheel 21 is actuated, and the direction of its rotation may be varied as desired.

The traction members are held in such position that the lower run thereof between the guide wheels 15 and sprockets 13 will be maintained substantially horizontal at all times by a series of wheels 26. These are mounted on axles supported by a supplemental frame 27 that is connected with the transverse frame bars 4 and 7 by brackets 28, 29, and at the forward end is connected with the front cross bar 5. Auxiliary supporting rolls for the upper runs of the traction members are provided between the sprockets 13 and guide wheels 15.

In addition to the traction members the machine is supported by a ground wheel 30. This is mounted on an axle 31 that is fixed at the lower end of a double arch-shaped extension of the main frame. As shown, two uprights 32 are attached to the longitudinal frame member 2 and similar uprights 33 are secured to the frame member 1. The aligned uprights 32, 33, are connected at their upper ends by frame bars 34 that extend laterally beyond the main frame and are connected by cross bars 35, 36, and intersecting brace bars 37 and 38 to provide a rigid frame. The bearings for the axle 31 of the ground wheel 30 are supported by arms 40 that depend from and are rigidly secured to the corner plates connecting the bars 35 and 36 with the frame bars 34. The members 34 of the arch-shaped portion are at such a height that they may freely pass over plants which have reached the maximum growth when the traction members are in a furrow at one side of such row and the ground wheel on the opposite side thereof. In order that the machine may be adapted for cultivating plants arranged in rows at different distances apart, means are provided whereby the wheel 30 may be adjusted on its supporting axle to vary the distance separating it from the traction members. The hub of the wheel 30 is arranged between collars 41, 42, that are adjustable on the axle 31 being secured in any adjusted position thereon by any suitable means, such as set screws. Therefore, by loosening the means connecting such collars with the axle they, and the wheel 30, may be moved longitudinally of the axle and the collars again secured when the wheel is at the desired distance from the traction members.

The wheel 30 is positively driven by the motor 20 through the following connections. A shaft 44 journaled in a cross bar connecting the uprights 32, 33, of the arch-shaped portion of the main frame and in the cross bar 35 of said frame is provided at its end adjacent the wheel 30 with a pinion 45 that is connected through a chain with a sprocket on the hub of wheel 30. On the shaft 44 is mounted a friction disc 46 which is adapted to engage a friction drive wheel 47 mounted on one end of a shaft 48 supported in suitable bearings on the frame and adapted to be rotated from the main motor shaft. As shown, a sprocket 49$^a$ on the shaft 48 is connected by a chain 49 with a sprocket on the main motor shaft so that the shaft 48 and friction drive wheel 47 will be constantly rotated, when the motor is running, at the speed of the main shaft. To enable the wheel 30 to be adjusted laterally, as above described, without destroying the connection between it and the motor the shaft 44 is made in two telescoping sections, 44$^a$ and 44$^b$, (see Figure 2). Means are also provided whereby the speed at which the wheel 30 is rotated may be varied independent of any variation in the speed of the motor shaft or of the traction members. For this purpose the friction disc 46 is mounted on its supporting shaft so as to be free to be adjusted longitudinally thereof while rotating therewith. Preferably the hub of said disc is fitted to a squared section of the shaft and a rack 50 is connected to the disc and extends horizontally therefrom. A pinion 50$^a$ at one end of a shaft 51 engages the rack and at its other end said shaft is provided with a hand wheel 52 by means of which it may be rotated. Rotation of the shaft 51 will move the disc 46 over the face of the driving wheel 47 and thus vary the speed of rotation of the shaft 44 and ground wheel 30, as will be readily understood.

Means are also provided whereby the friction wheel 47 and disc 46 may be disconnected when desired. To effect this, in the embodiment of the invention illustrated, the shaft 48 is provided with a non-circular section that is surrounded by the sprocket 49 and a coil spring 53 is interposed between the hub of the sprocket and a collar fixed on the shaft. This spring acts to normally hold the wheel 47 in engagement with the friction disc 46. However, by means of an arm 54 and a fork 54$^a$, on a suitable rock shaft the shaft 48 and wheel 47 thereon may be moved against the action of the spring 53 so that the disc 46 will be disconnected from the motor. The fork 54$^a$, as shown, bears against the rear face of a collar on shaft 48 and the arm 54 is connected by a rod 55 with a hand lever 56 suitably pivoted on the main frame and coacting with a sector 57 to retain the friction driving wheel in either operative or inoperative position.

Suitable brake devices are provided for controlling the movements of the endless traction members. As shown, each sprocket 13 is provided on its outer face with a brake drum 60 with which cooperates a brake adapted to be operated by a suitable lever, shown as having the form of a foot treadle. The two brake-actuated treadles 61, 62, are arranged side by side, the one acting directly upon the brake of the adjacent sprocket and the other being connected to a rock shaft which, in turn, is connected to the brake of the other sprocket. Adjacent said treadles is a third, similar treadle, 63 which is connected with the clutch by which the shaft of the motor is connected with the shaft that drives the traction members and wheel 30, as hereinbefore described.

As hereinbefore stated, the improved tractor is particularly adapted for use with cultivating implements, and in the accompanying drawings such an embodiment of the invention is illustrated. As shown, a series of cultivating shovels 65 are supported in a suitable frame, which, at the forward end, is connected by a chain 66 to a lug depending from the main frame, and which, at its rear, is arranged between coil springs 67, 68, fitted about rods connected to a bar that is supported by arms 79 on a rock shaft. The shaft carrying the arms 79 is adapted to be rocked to raise or lower the cultivator shovels by means of a hand lever 80. The machine, as shown, is provided with a seat 81 for the operator, and it will be noticed that all of the parts requiring manipulation to control the starting of the motor, the rate of movement of the traction members and ground wheel and the raising and lowering of the cultivator frame are all within easy reach of an operator occupying said seat.

As shown in the drawings, the axis of the ground wheel 30 is some distance in advance of the driving axles of the traction members and means are provided whereby movement of such wheel may be readily controlled independent of the traction members. The brace bars 37, 38, of the lateral extension or arch-shaped portion of the main frame, are rigidly connected with the main frame bar 1 by an inclined bar of angle iron which effectually prevents twisting or displacement of the support for the ground wheel 30 relative to the main frame.

As shown on the drawings all of the frame members are formed of angle iron suitably connected by anchor plates riveted securely to the several members so that the machine will readily withstand the various strains which are placed upon it when in use.

The main frame members 1, 2, which extend substantially throughout the entire length of the machine include substantially horizontal forward, rear and intermediate sections which are connected by inclined portions so that the forward end of the machine is relatively close to the ground and the intermediate horizontal sections of said frame members to which the supports for the traction driving axles are secured is elevated somewhat. The rear horizontal portions of the side bars are elevated sufficiently to permit the cultivating shovels or plows, shown in the drawings, being positioned substantially below them. It will be noted particularly that the main frame of which the bars 1, 2, form the sides is quite narrow, all of the parts being compactly arranged therein so that this frame will not extend into contact with the rows of plants between which it travels when employed for use with cultivating implements. This particular arrangement is of advantage also when the machine is used for other purposes because it positions the traction members relatively close together so that while a firm engagement with the ground is afforded the machine may be readily guided.

In Figs. 12 to 16, inclusive, there is illustrated a slightly modified form of means for transmitting power from the drive shaft 23 to the endless traction members and controlling movement of such members.

In this form of the invention the differential gearing is not located between the sprockets 13 of the endless traction members, but is supported by frame bars 90. As shown particularly in Fig. 14, the differential mechanism includes two shafts 91, the inner ends of which extend into a gear box 92 and are provided with pinions that mesh with suitable pinions mounted in the box 92 in the ordinary manner, and the exterior gear 93 on the gear box 92 meshes with a pinion secured to the rear end of the drive shaft 23.

On each shaft 91 is mounted a sprocket 94 which is connected by a chain 95 with a sprocket 96 that is secured to the outer face of the sprocket 13 of one of the traction members.

At its outer end each shaft is provided with a brake wheel or disc 97 with which cooperates a suitable brake band that is connected to the foot pedal 61 by a rod 98 and lever arm 99.

The sectional casing or housing 100 which surrounds all of the parts of the differential driving mechanism includes guides for the aforesaid chains 95 and for the chain 49 which drives the friction wheel 47. The manner of operating and the advantages incident to the structure hereinbefore described will be readily appreciated. It will be seen that the invention provides a very compact and powerful implement which can be readily controlled. By reversing the direction of rotation of the ground wheel to the direction of movement of the traction members the machine can be turned pivotally, said movement being assisted by suitable manipulation of the brakes.

What is claimed is:

1. In a tractor, the combination of a frame, two parallel endless traction members supported by the frame, a ground wheel at one side of said traction members, a motor, and two independent sets of means actuated by the motor for positively driving both said traction members and the ground wheel, respectively.

2. In a tractor, the combination of a frame, two closely adjacent, parallel, endless traction members mounted in said frame, a ground wheel supported by the frame intermediate of the length of the traction members, a motor, and independent trains of gearing connecting the motor with the traction members and said ground wheel.

3. In a tractor, the combination of a main frame, two closely adjacent endless traction members mounted within said frame, a ground wheel supported at one side of the main frame, a motor, means for positively driving both traction members and the ground wheel from the motor, and means for varying the speed of rotation of the ground wheel independent of any variation of speed of the traction members.

4. In a tractor, the combination of a frame, an endless traction member mounted in the frame and including a series of links each provided with means for breaking up the ground over which it travels, a ground wheel at one side of the frame, a motor, and independently controlled means for positively driving the traction member and ground wheel, respectively, from the motor.

5. In a tractor, the combination of a frame, two driving sprockets mounted in the frame, two guiding wheels in the frame in advance of said sprockets, two endless traction belts extending around said sprockets and guide wheels, a ground wheel supported at one side of the frame, a motor, and two independent trains of gearing respectively connecting the motor with said sprockets and ground wheel.

6. In a tractor, the combination of a frame, two endless traction members mounted in the frame, a ground wheel supported by the frame at one side of the frame, a motor, gearing connecting the motor with both traction members, connections between the motor and ground wheel, means for independently controlling movement of either traction member, and independent means controlling movement of the ground wheel.

7. In a tractor, the combination of a frame, two closely adjacent endless traction members mounted in the frame, a ground wheel mounted at one side of the frame, means for adjusting said wheel bodily to and from the traction members, a motor, and means connecting the motor with both traction members and with the ground wheel.

8. In a tractor, the combination of a frame, two endless traction members mounted in the frame, and each comprising a series of pivotally connected links each provided with a projecting spur or tooth, a ground wheel supported at one side of the frame, said traction members being arranged relatively close together so that they may both travel in a furrow at one side of a row of growing plants while the ground wheel travels in a furrow on the other side of said row, a motor, and means for positively driving both traction members and the ground wheel from the motor.

9. In a tractor, the combination of a frame, two endless traction members mounted in the frame, a ground wheel supported at one side of the frame, a motor, connections between the motor and both traction members, a counter shaft mounted in the frame and provided at one end with a friction disc, gearing connecting said countershaft with the ground wheel, a friction wheel mounted on the frame in position to engage said friction disc and connected to the motor to be rotated thereby, means for moving the friction disc longitudinally of the countershaft while engaged by the friction wheel to vary the speed of rotation of the ground wheel, means for independently controlling the speed of either traction member, and means for disengaging the friction disc and wheel.

10. In a tractor, the combination of a frame, two alined shafts mounted in bearings in said frame, a differential gearing connecting the adjacent ends of said shafts, a sprocket wheel mounted on each shaft within the side members of the frame and closely adjacent said differential gearing, guide wheels on the frame in advance of said sprocket wheels, two endless traction members embracing the sprockets and guide wheels, a motor, and connections between the motor and said differential gearing.

11. In a tractor, the combination of a frame, two closely adjacent endless traction members mounted on the frame, oppositely dished coaxial sprockets for driving the traction members, gearing for driving the traction members arranged within the space between said sprockets, a motor, and connections between the motor and said gearing.

12. In a tractor, the combination of a frame, two aligned axles mounted in bearings on the frame, differential gearing connecting the adjacent ends of said axles, sprockets mounted on the axles and having their sides partially enclosing said gearing, guide wheels on the frame in advance of the sprockets, endless traction members supported on the sprockets and guide wheels, a motor, and connections between the motor and said gearing.

13. In a tractor, the combination of a frame, two aligned axles mounted in bearings on the frame, differential gearing connecting the adjacent ends of said axles, a casing enclosing said gearing, sprockets mounted on the axles and having oppositely dished bodies which substantially conform to and partially enclose the differential casing, endless traction members embracing said sprockets, a motor, and a power shaft connected to the motor and extending into the differential casing to drive the gearing therein.

14. In a tractor, the combination of a frame, two endless traction members mounted on the frame, a ground wheel supported at one side of the frame, a motor, connections between the motor and traction members, independent gearing connecting the motor and ground wheel, a brake adapted to cooperate with each traction member, and independent means for disconnecting the ground wheel and motor.

15. In a tractor, the combination of a frame, two closely adjacent sprocket wheels mounted in said frame, and each provided with a brake surface, a guide wheel mounted in the frame in advance of each sprocket, an endless traction member supported by each sprocket and aligned guide wheel, differential gearing arranged between said sprockets, a ground wheel at one side of the frame, a motor, connections between the motor and differential gearing, and two independently operable brakes adapted to respectively cooperate with the brake surfaces on the sprockets.

16. In a tractor, the combination of a frame, two aligned, transversely extending, axles mounted in bearings in the frame, differential gearing connecting the adjacent ends of said shafts, a casing supported by the frame and surrounding said gearing, sprocket wheels, secured respectively to said shafts between the side members of the frame and close to the gear casing, a guide wheel mounted in the frame in advance of each sprocket, endless traction members supported by the sprockets and guide wheels, a motor, a shaft connected to the motor and extending into the gear casing, means connecting said shaft and the main drive wheel of the differential gearing, and two independent brakes each adapted to control rotation of one of the sprockets.

17. In a tractor, the combination with a frame, a motor mounted at the forward end of the frame, two endless traction members mounted in and extending longitudinally of the frame, means for driving both traction members from the motor, a ground wheel supported at one side of the traction members in a lateral extension of the frame, means for positively driving the ground wheel from the motor, means operable from the rear of the machine for varying the speed of the ground wheel without disconnecting it from the motor, a lever mounted adjacent the rear end of the machine and connected with means for disconnecting the motor and ground wheel, and brake devices, adapted to be operated from the rear end of the machine for controlling movement of the traction members.

18. In a tractor, the combination of a main frame including two parallel longitudinally extending bars connected at suitable intervals by transverse bars, uprights rising from said side bars, transverse frame bars connecting the upper ends of said uprights and extending laterally beyond one side of the main frame bars, a ground wheel mounted on an axle supported by said transverse frame bars, traction members supported in the main frame beneath said transverse bars, a motor, and independent trains of gearing connecting the motor with the traction members and the ground wheel respectively.

19. In a tractor, the combination of a main frame, traction members mounted in said frame, an arch-shaped extension of the main frame extending laterally to one side thereof, a ground wheel supported by said arch-shaped extension, a motor mounted on the main frame, connections between the motor and the traction members, means mounted on the arch-shaped frame for positively driving the ground wheel, and independent connections between said ground wheel driving means and the motor.

20. In a tractor, the combination of a main frame, endless flexible traction means mounted in the main frame, a motor, connections between the motor and the traction means, a ground wheel supported at one side of the main frame, a countershaft mounted above the traction means and extending beyond one side of the frame toward the ground wheel, a sprocket at the outer end of said countershaft, a sprocket on the hub of the ground wheel, a chain connecting said sprockets, means for driving said countershaft from the motor, and means for varying the speed of said countershaft, without disconnecting it from the motor.

21. In a tractor, the combination of a main frame, endless flexible traction means mounted in said frame, a motor, means connecting the traction means and motor, a ground wheel supported at one side of the main frame, a countershaft extending transversely of the main frame and beyond one side thereof toward the ground wheel, means connecting said countershaft with the ground wheel, a friction disc on the countershaft, a friction wheel geared to the motor and adapted to engage said friction disc, and means for disconnecting said disc and wheel, at will.

22. In a tractor, the combination of a main frame, uprights rigidly secured to said main frame, a supplemental frame rigidly secured to the upper ends of said uprights and extending laterally beyond one side of the main frame, bearings supported beneath the outer end of said lateral extension of the frame, an axle in said bearings, a ground wheel on said axle, endless flexible traction members mounted in the main frame, a motor, and independent connections between the motor and traction members and between the motor and ground wheel, the latter permitting the ground wheel to be adjusted bodily toward and from the main frame without being disconnected from the motor.

23. In a tractor, the combination of a main frame, endless flexible traction members mounted in said frame, an arch-shaped extension extending laterally from one side of the main frame, a ground wheel mounted in bearings at the outer end of the arch-shaped extension, a motor on the main frame, means connecting the motor with the traction members, and connections between the motor and ground wheel including a telescoping shaft, whereby said wheel may be bodily adjusted toward and from the main frame without being disconnected from the motor.

In testimony whereof we have hereunto set our hands.

RAPHAEL JOSEPH FOLSE.
FREDERICK LAWRENCE HECKER.